US005672653A

United States Patent [19]
Frisch et al.

[11] Patent Number: 5,672,653
[45] Date of Patent: Sep. 30, 1997

[54] ANIONIC WATERBORNE POLYURETHANE DISPERSIONS

[75] Inventors: Kurt C. Frisch, Grosse Ile; Bhikhubhai P. Suthar, Canton; Han X. Xiao, Bloomfield Hills, all of Mich.

[73] Assignee: Elf Atochem North America, Inc., Philadelphia, Pa.

[21] Appl. No.: 645,438

[22] Filed: May 13, 1996

[51] Int. Cl.⁶ .................. C08J 3/00; C08K 3/20; C08L 75/00; B32B 27/00
[52] U.S. Cl. .................. 524/591; 524/590; 524/839; 524/840; 428/423.1; 264/204
[58] Field of Search ........................... 524/591, 839, 524/840, 590; 428/423.1; 264/204

[56] References Cited

U.S. PATENT DOCUMENTS

| | | | |
|---|---|---|---|
| 4,507,430 | 3/1985 | Shimada et al. | 524/840 |
| 4,644,030 | 2/1987 | Loewrigkeit et al. | 524/840 |
| 5,504,145 | 4/1996 | Treasurer | 524/591 |

*Primary Examiner*—George F. Lesmes
*Assistant Examiner*—Patrick Niland
*Attorney, Agent, or Firm*—Stanley A. Marcus; William D. Mitchell

[57] ABSTRACT

Anionic waterborne polyurethane dispersions made using hydroxyl terminated polybutadiene resins and use of the dispersions to make films and adhesives.

9 Claims, No Drawings

ANIONIC WATERBORNE POLYURETHANE DISPERSIONS

BACKGROUND OF THE INVENTION

This invention relates to relates to anionic waterborne polyurethane dispersions and to coatings and adhesives made therefrom, particularly to such dispersions which are made using hydroxyl terminated polybutadiene resins.

Commercial waterborne polyurethane dispersions are typically made using polyester or polyether polyols.

BRIEF SUMMARY OF THE INVENTION

Anionic waterborne polyurethane dispersions are provided, which dispersions are made using a polyol which comprises one or more hydroxyl terminated polybutadiene resins. The polybutadiene resin may also be combined with a less hydrophobic polyol, such as a polyester or polyether polyol.

The invention also relates to coatings and adhesives made using such dispersions. Coatings and films made from these dispersions show improved moisture resistance and lower glass transition temperatures.

DETAILED DESCRIPTION

Despite the known hydrophobicity of hydroxyl terminated polybutadiene resins, it has now been surprisingly discovered that storage stable, ready to use, one component anionic waterborne polyurethane dispersions can be prepared by traditional methods using these polybutadiene resins. Coatings made from these dispersions have good moisture resistance properties, as well as unusually low glass transition temperatures (down to about −70° to −75° C.) so that they remain flexible at low temperatures. The dispersions have low viscosities, normally about 10–40 centipoise (cps) or milli-Pascal-seconds (m.Pa.s), which enables them to have a high solids content (typically about 30–40 weight %).

Examples of useful hydroxyl terminated polybutadiene resins are Poly bd® resins available commercially from Elf Atochem, such as Poly bd R-20LM, a hydroxyl terminated polybutadiene resin having a number average molecular weight, "MW", of 1200. The resins will typically have a MW of from about 1000 up to about 3000. Higher molecular weight resins tend to be very viscous and difficult to disperse, while films made from lower molecular weight resins have a tendency to crack. Resins at the upper end of this molecular weight range, such as Poly bd R-45HT (MW of 2800), are normally blended with a less hydrophobic polyol such as the Poly bd R-20LM or a polyester or polyether polyol in a molar ratio of R-45HT:the other polyol of from about 60:40 to about 30:70. If a low molecular weight resin such as R-20LM is used alone, the tendency of the film to crack can be reduced by heating the dispersion during the film-making drying step, such as at about 60° C. The lower molecular weight hydroxyl terminated polybutadiene resins (such as Poly bd R20LM) may likewise be blended with polyester or polyether polyols. Examples of useful polyester or polyether polyols include Poly-G 20–56, a poly(oxypropylene) glycol which is non-ethylene oxide capped and has a MW of 2000, available from Olin Chemical Co.; T2000, a poly(oxytetramethylene) glycol having a MW of 2000, available from the DuPont company; Formrez E-65–46, an adipate polyester having a MW of 2000, available from Witco; and Tone 0240, a poly(caprolactone) glycol having a MW of 2000, available from Union Carbide.

The dispersions can be prepared by traditional procedures. By way of example, a pre-polymer can be made by heating a mixture of polyols, an aliphatic isocyanate such as isophorone diisocyanate (IPDI), and a diol containing acid groups such as dimethylolpropionic acid (DMPA) which has been dissolved in N-methylpyrrolidone (NMP), along with dibutyltin dilaurate catalyst. In the reaction, the ratio of reactants is normally such that the ratio of isocyanate groups to hydroxyl groups is from about 2:1 to about 2.5:1, though higher ratios can be used, and the molar ratio of DMPA to polyol is normally from about 1:1 to about 2:1 (while higher ratios can be used, the material tends to become too hydrophilic). Typical reaction times and temperatures run from about 2–5 hours and from about 60°–80° C. After this time, the percent isocyanate can be determined by titrating with dibutylamine. Next, a tertiary amine such as triethylamine (TEA) is added at a temperature of from about 50–80° C. in an amount sufficient to neutralize the acid groups from the DMPA, normally for a period of 20 minutes or less, to form an anionic salt, followed by cooling. Water is then added to the polyurethane pre-polymer with high speed agitation, typically in an amount sufficient to obtain a dispersion containing about 30–40 weight percent solids, followed by chain extension with a diamine such as ethylenediamine (EDA) or hydrazine (HZ), preferably EDA. The following is a recipe using a mixed polyol blend:

| Component | Parts by Weight | Equivalents |
| --- | --- | --- |
| DMPA | 6.7 | 0.100 |
| NMP | 12.1 | |
| R45HT | 29.1 | 0.025 |
| R20LM | 13.3 | 0.025 |
| IPDI | 33.3 | 0.300 |
| Dibutyltin dilaurate | 0.05 | |
| TEA | 5.05 | 0.050 |
| Water | 186.0 | |
| EDA | 4.5 | 0.150 |

Films and adhesives can be made from these dispersions by methods known in the art. Thus, the dispersions would be formulated with other resins, fillers and pigments to achieve the desired properties; for example, they may be blended with acrylics to increase adhesion and clarity. The films may be cast from the dispersion or applied, for example, by spraying, brushing or rolling. Uses for such films and adhesives include fiberglass sizings, coatings for leather, wood, and plastic, construction of corrugated paperboard and the like.

Illustrative of the invention is the following example:

Following the general procedure outlined above, a stable anionic waterborne polyurethane dispersion having a viscosity of less than 50 cps (as measured by a Brookfield viscometer at room temperature) and a solids content of 37.6% was made using as the polyol R45HT and R20LM in a molar ratio of 60:40, IPDI as the isocyanate with a ratio of isocyanate groups to hydroxyl groups of 1.8:1, TEA as the neutralizing amine, EDA as the chain extender, and a molar ratio of DMPA to polyol of 1.8:1. Film was made by casting the dispersion in a silicon coated mold and drying at room temperature for 72 hours. Measurements of the film on an Instron-Tensile Tester at 5 inches/minute of crosshead speed showed the film to have good tensile strength (1920 psi) and elongation (130%). A one inch by one inch dried film sample, immersed in water in a small plastic container with a closed lid for 144 hours, adsorbed less than 19 percent water.

We claim:

1. An anionic waterborne polyurethane dispersion prepared by a process comprising the following steps:

(A) forming a prepolymer consisting essentially of a hydroxyl terminated polybutadiene resin, an aliphatic isocyanate, and a diol containing acid groups;

(B) neutralizing the prepolymer of step (A);

(C) adding water to form a prepolymer dispersion of the neutralized prepolymer; and (D) chain extending said prepolymer dispersion with a diamine.

2. A dispersion as in claim 1 wherein the prepolymer of step (A) contains a mixture of hydroxyl terminated polybutadiene resins.

3. A dispersion as in claim 1 wherein the prepolymer of step (A) also contains a polyester or polyether polyol.

4. An adhesive made by blending an acrylic with the polyurethane dispersion of claim 1.

5. An adhesive made by blending an acrylic with the polyurethane dispersion of claim 2.

6. An adhesive made by blending an acrylic with the polyurethane dispersion of claim 3.

7. A film made from the polyurethane dispersion of claim 1.

8. A film made from the polyurethane dispersion of claim 2.

9. A film made from the polyurethane dispersion of claim 3.

* * * * *